United States Patent Office 3,511,525
Patented May 12, 1970

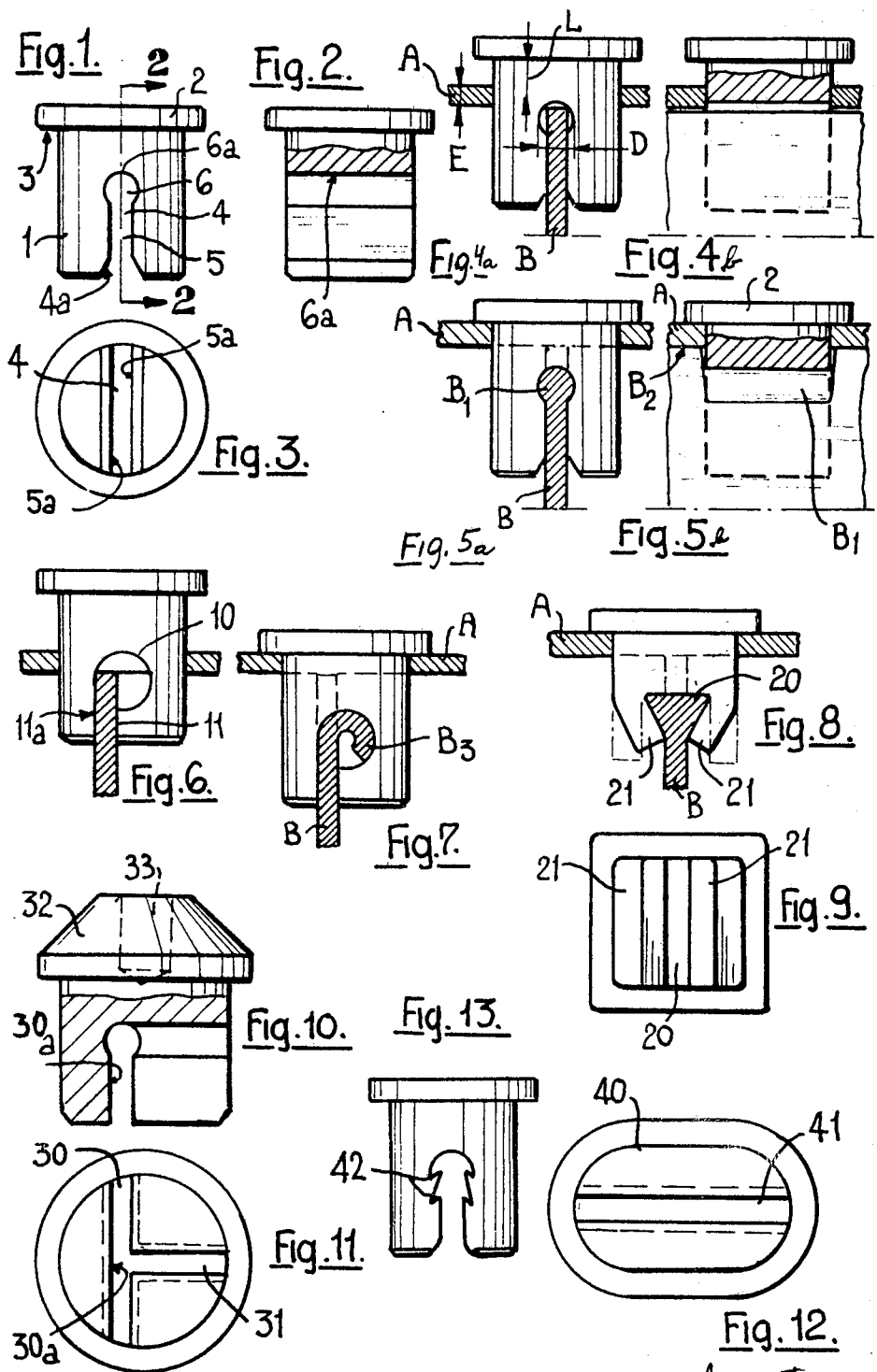

3,511,525
CONNECTING DEVICE FOR FASTENING TOGETHER TWO THIN PLATES IN RELATIVE PERPENDICULAR POSITIONS
Gerard Friedling and Marcel Chuard, Geneva, Switzerland, assignors to Technicair S.A., Vernier, Geneva, Switzerland, a corporation of Switzerland
Filed Sept. 4, 1968, Ser. No. 757,259
Claims priority, application Switzerland, Sept. 5, 1967, 12,407/67
Int. Cl. F16b 5/00
U.S. Cl. 287—189.36                6 Claims

ABSTRACT OF THE DISCLOSURE

A device for assembling two thin plates in relative perpendicular positions, which comprises a first part adapted to be inserted into an opening of one of the plates, and a head forming an exterior shoulder on the first part and adapted to limit the insertion of the device into the opening of one of the plates. The first part is crossed by a slot adapted to receive a marginal portion of the second plate disposed perpendicularly to the first plate, and the slot has a first straight part and a posterior part, the latter being much greater than that of the first straight part. The base of the slot is disposed in front of the exterior shoulder such, that in the maximum insertion of the device corresponding with an abutment position of the two plates and bearing of the head on the first plate. The marginal portion of the plate inserted in the slot is locally deformed upon contact with the base and forms a lateral swelling, thereby securing the second plate to the assembling device.

---

The present invention relates to a connecting device for fastening together two thin plates in a perpendicular position.

It is one object of the present invention to provide a connecting device for fastening together in perpendicular position two thin plates, which device is characterized by the fact that it comprises a first part adapted to be inserted into an opening of one of the plates and a head forming an outer shoulder adapted to limit the insert of the device into this opening. This first part is disposed cross-wise to a slot adapted for setting a marginal portion of the second plate which is arranged perpendicularly to the first plate which slot comprises a first straight part and an additional part much larger than the preliminary part and the base of the slot is disposed in front of the exterior shoulder such, that due to the maximum insertion of the device corresponding to a position in which the two plates abut each other and at the support of the head on the first plate, the marginal portion of the plate being inserted in the groove locally deformed at the contact of that bottom and forms in the additional part of the groove a lateral bead securing that second plate to the connecting device.

With these and other objects in view, which will become apparent in the following detailed description, the present invention, which is presented by example only, will be clearly understood in connection with the accompanying drawings, in which:

FIG. 1 is an elevation of a first embodiment of the device designed in accordance with the present invention;

FIG. 2 is a section along the lines 2—2 of FIG. 1;

FIG. 3 is a bottom plan view of the device shown in FIG. 1;

FIGS. 4a and 4b, as well as FIGS. 5a and 5b each are views similar to those of FIGS. 1 and 2 and showing the device disposed on two plates to be fastened together in two positions of the two phases of putting the plates into place;

FIGS. 6 and 7 show elevations of a second embodiment of the device, the latter being shown disposed in connection with two plates to be assembled in two phases of such assembly;

FIG. 8 is an elevation in partial section of a third embodiment of the device;

FIG. 9 is a bottom plan view of the device shown in FIG. 8;

FIG. 10 is an elevation in partial section of a fourth embodiment of the device;

FIG. 11 is a bottom plan view of the device shown in FIG. 10;

FIG. 12 is a bottom plan view of a fifth embodiment of the present invention; and FIG. 13 is an elevation of a sixth embodiment of the present invention.

Referring now to the drawings, and more particularly to FIGS. 1–3, the device disclosed therein comprises a first cylindrical shank member 1 and a head 2 of much greater diameter than that of the member 1, thereby forming a peripheral shoulder 3 at the outer extreme of the cylindrical member 1. The latter is crossed by a transverse slot 4 which comprises a first straight part 5 in which the slot 4 presents lateral parallel margins 5a and a second section 6 of circular shape. The outer portion 6, which is much larger in width than the first portion 5 is centered by the latter and the base 6a of the slot 4 is disposed spaced apart from the shoulder 3.

As indicated in FIG. 4, in order to fasten together two plates A and B in relative perpendicular position, the cylindrical member 1 is inserted into an opening of the plate A, whereby the slot 4 receives a marginal part of the plate B which is disposed perpendicularly to the plate A. In a first phase of putting the plates into place, as shown in FIGS. 4a and 4b, the plate B is simply inserted into the slot 4 and the plate A can be displaced still on the rear portion of the cylindrical member 1, the distance L separating the base 6a of the slot 4 from the shoulder 3 which distance is much greater than the thickness E of the plate A.

In a second phase, the device is inserted at the bottom into the opening of the plate A, so that the plate B is retained by the support of the opposed edge portion or its clamping by holding means (not shown). During this movement, the marginal portion of the plate B disposed in the slot 4 is locally deformed by engagement of the bottom 6a of the slot acting in the manner of a stamp, such that the plate material is set and forms a flange $B_1$ filling in the second portion of the slot and attaching the plate B to the fastening device.

The member is then in the position shown in FIGS. 5a and 5b. The distance L and the diameter D of the posterior portion of the slot can be determined by the given thickness of the plates, such that the plate A will be rigidly secured between the head 2 and the non-deformed border $B_2$ of the plate B.

It is not indispensable that the cylindrical member 1 enters just precisely into the opening of the plate A and a connecting washer (not shown) could be disposed under the shoulder 3, to fill up the opening in a tight manner.

The first part 5 of the slot is relatively low and constitutes a guide for the plate B. An inclination 4a facilitates the insertion of the plate B into the slot 4.

In the second embodiment disclosed in FIGS. 6 and 7, a posterior part 10 of the slot 11 of circular shape is offset by means of a first part 11 more straight, such that the lateral wall 11a of the first part is fitted to the circular wall of the posterior part. Upon insertion of the device. the marginal portion of the plate inserted into the slot is thus guided to be curved as shown as a portion B₃ in FIG. 7, by forming locally a curved board of the plate B attached to the device. In this embodiment the curved base of the slot acts on the edge of the plate in the manner of a tool for progressive buckling.

In the embodiment shown in FIGS. 8 and 9 the assembling device has in a plan view a generally square form, as seen in FIG. 9. It comprises a slot 20 of generally trapezoidal cross-section limited laterally by two oblique wings 21. The device could be designed starting with a cut in which the mentioned wings are disposed which assume at first the straight position shown in different directions, which are then lowered one against the other in order to give to the slot the desired convergent section. This device could also be used by sectioning of a drawn profile which presents a profile correspoding to the contour of the device as shown in FIG. 8.

In the embodiment shown in FIGS. 10 and 11 the slot is approximately of the same straight section as the slot 4 in the device of FIG. 1, however, this slot comprises a transverse branch 30, a non-transverse branch 31. The device can thus be used by placing a plate transversely into the branch 31. In the latter case, the device can be used for longitudinal positioning of the plate inserted into the branch 31 and portion is in abutment against the wall 30a. The device could equally be utilized in order to assemble to a first plate two other plates perpendicularly to the first plate and forming a right angle relative to each other.

In the embodiments, the device could comprise several slots which are disposed crosswise or not and forming, according to the particular case, angles different from 90°.

The device disclosed in FIG. 10 comprises a head 32 pierced by a hole 33 which is cut in. The device could also be joined with another device of support which is threaded in the hole in order to sustain the assembled plates, for instance. In the embodiments the head of the assembling device could comprise other means attached thereto.

In the embodiment shown in FIG. 12, the device comprises a member 40 of oblong section transversed in longitudinal direction by a rectilinear slot 41. The plate inserted into the slot 41 is thus guided for an appreciable length, without making important projections at the sides. In one embodiment, the slot could be curved in order to adapt itself to a plate having a corresponding form or in order to give a curved form to an elastic rectilinear plate curved during the introduction into the slot.

In the embodiment disclosed in FIG. 13 the lateral walls of the slot present teeth 42 on which the plate is anchored. The device can be formed by casting, hardened metal or other material.

One of the preferred utilizations of the device in accordance with the present invention is the assembling of plates, having aluminum edges, in order to form directive walls or for separation the interior for gaining a ventilation or for fixing in order to form a ventilation channel. The utilization of the device in accordance with the present invention is not limited, however, to the assembling of metallic plates.

We claim:
1. A device for assembling two thin plates in relative perpendicular positions, comprising two thin plates,
   a first part having a substantially solid shank and inserted into an opening of one of said plates,
   a head forming an exterior shoulder means on said first part limiting the insertion of said device into said opening of said one of said plates,
   said shank of said first part being crossed by a slot receiving a marginal portion of the other of said plates disposed perpendicularly to said one of said plates,
   said slot having a first straight part and a posterior part, the latter forming a straight section of circular shape, said circular shape being much greater in width than that of said first straight part and centered relative to said first straight part, and
   the base of said slot being disposed in front of said exterior shoulder such, that in the maximum insertion of said device corresponding with an abutment position of said two plates and bearing of said head on said one of said plates, the marginal portion of said other of said plates inserted in said slot being locally deformed upon contact with said base and forming a lateral swelling in said posterior part, thereby securing said second plate to said assembling device.
2. The device, as set forth in claim 1, wherein said slot constitutes in said first part lateral parallel engagement means adapted to support laterally said plate disposed in said slot.
3. The device, as set forth in claim 1, wherein said slot has a straight section of generally trapezoidal shape.
4. The device, as set forth in claim 1, wherein said posterior part of said slot is laterally widened relative to the narrower first straight part of said slot.
5. The device, as set forth in claim 1, wherein said posterior part of said slot is conformed in order to deviate laterally, said lateral swelling constituting a deformed marginal portion of said other of said plates disposed in the slot and forming a swelling defined by a curved edge.
6. The device, as set forth in claim 1, wherein one extremity of said slot is closed.

References Cited
UNITED STATES PATENTS

| | | | |
|---|---|---|---|
| 2,317,561 | 4/1943 | Tinnerman. | |
| 2,465,055 | 3/1949 | Bohme | 287—189.36 |
| 3,350,124 | 5/1965 | Husted | 287—189.36 |

EDWARD C. ALLEN, Primary Examiner